Sept. 26, 1967    E. A. WAHL    3,344,293
ELECTRO-MECHANICAL GYRATOR
Filed July 12, 1965    3 Sheets-Sheet 1
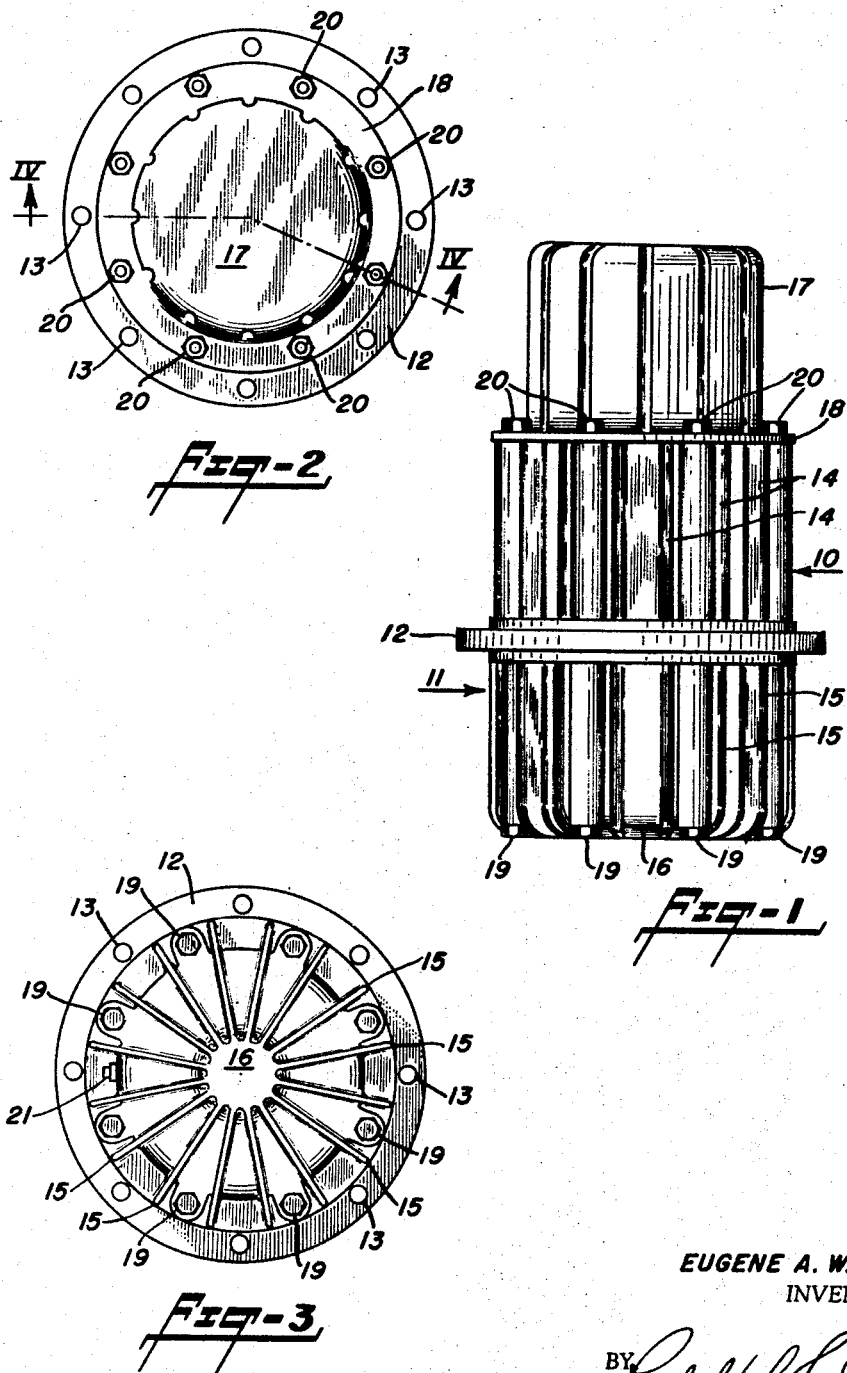
EUGENE A. WAHL
INVENTOR.
BY Rudolph J. Jwick
ATTORNEY Sept. 26, 1967

E. A. WAHL 3,344,293

ELECTRO-MECHANICAL GYRATOR

Filed July 12, 1965

EUGENE A. WAHL
INVENTOR.

BY Rudolph J. Smick
ATTORNEY

Sept. 26, 1967     E. A. WAHL     3,344,293
ELECTRO-MECHANICAL GYRATOR
Filed July 12, 1965     3 Sheets-Sheet 3
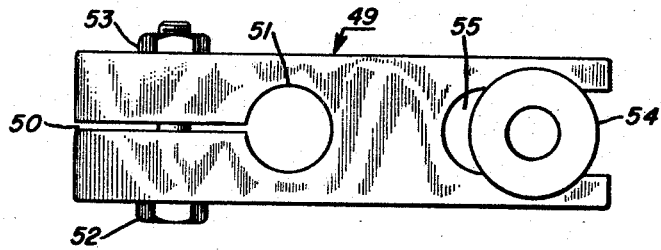
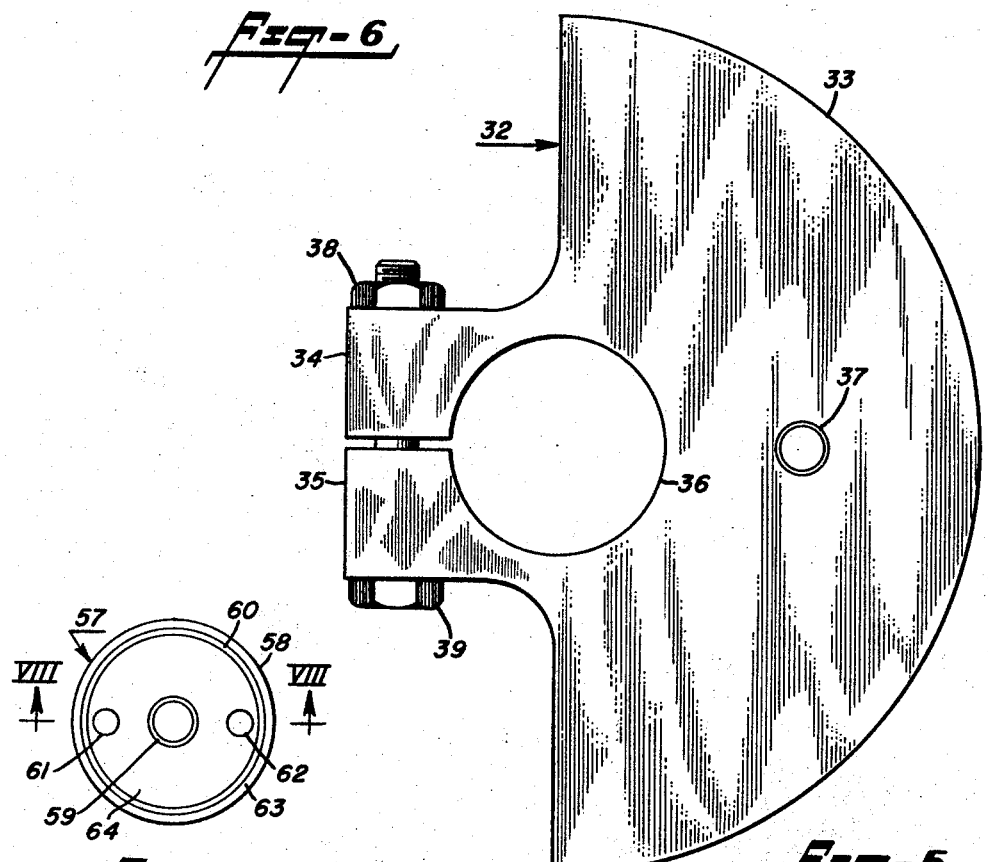
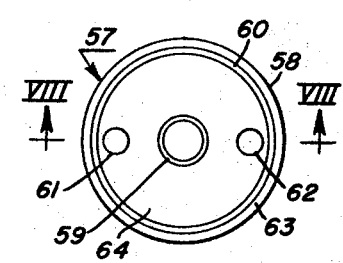
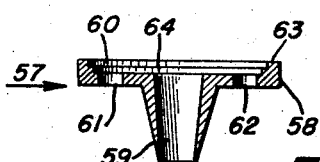
EUGENE A. WAHL
INVENTOR.
BY Rudolph J. Quick
ATTORNEY

United States Patent Office 3,344,293
Patented Sept. 26, 1967

3,344,293
ELECTRO-MECHANICAL GYRATOR
Eugene A. Wahl, 294 Forest Ave.,
Glen Ridge, N.J. 07028
Filed July 12, 1965, Ser. No. 471,023
11 Claims. (Cl. 310—81)

This invention relates to a device for producing mechanical vibrations and more particularly to an electro-mechanical gyrator for attachment to a structure to be vibrated thereby.

Gyrators, of the class to which this invention is directed, are designed to be secured to a vibratorily-mounted structure for the purpose of vibrating such structure at a predetermined frequency and amplitude. Such gyrators comprise weights mounted eccentrically on a shaft which is rotated by an electric motor. Generally, the structure to be vibrated has a substantial mass, whereby the dynamic forces involved are of such magnitude as to place a heavy load on the bearings associated with the shaft carrying the weights. Consequently, bearing lubrication, heat generation and dynamically unbalanced forces acting upon the bearings are factors which adversely effect the operating life of the device.

An electro-mechanical gyrator made in accordance with this invention is of the type commonly known as the integral type, that is, the electric drive motor and the rotatable, eccentric weight systems are enclosed within a single housing. The eccentric weight system comprises a pair of equal weights positioned at opposite ends of a pair of axially-aligned bearings thereby providing equal dynamic loads on the bearings. The bearings are lubricated by circulating oil providing temperature equalization between the balls and the races, thereby permitting minimum clearances between these members. These factors increase the useful operating life of the device. Further, the gyrator is so constructed so as to permit the use of a standard electric motor having a desired power rating and electrical characteristics. Such motor is removably secured to a housing, or pot, carrying the rotatable weight system and associated bearings, whereby one or the other of such major components can readily be replaced in the event it becomes inoperative.

An object of this invention is the provision of an electro-mechanical gyrator of improved construction, adapted particularly for heavy load applications and having a long operating life.

An object of this invention is the provision of an electro-mechanical gyrator wherein the drive shaft of an electric motor is removably coupled to an eccentric weight system disposed in a housing, wherein the eccentric weight system comprises to sections disposed on opposite sides of a pair of axially-disposed bearings, and wherein the bearings are lubricated by circulating oil upon rotation of the eccentric weight system.

An object of this invention is the provision of an electro-mechanical gyrator comprising two housing sections disposed on opposite sides of a mounting plate, axially-aligned bearings carried by the mounting plate, a bearing shaft extending through the bearings, a pair of weights disposed on opposite sides of the bearings and eccentrically secured to the bearing shaft, and an electric motor carried by one of the housing sections and having a drive shaft removably coupled to the said bearing shaft, the arrangement being such that the forces generated by rotation of the weights are uniformly applied to the bearings.

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

In the drawings wherein like reference characters denote like parts in the several views:

FIGURE 1 is a side elevational view of an electro-mechanical gyrator made in accordance with this invention;

FIGURE 2 is a top, plan view thereof;

FIGURE 3 is a bottom plan view thereof;

FIGURE 5 is a top, plan view of the upper eccentric weight;

FIGURE 6 is a top, plan view of the drive coupling;

FIGURE 7 is a top, plan view of the oil pump; and

FIGURE 8 is a vertical cross-sectional view taken along the line VIII—VIII of FIGURE 7.

Figure 4:
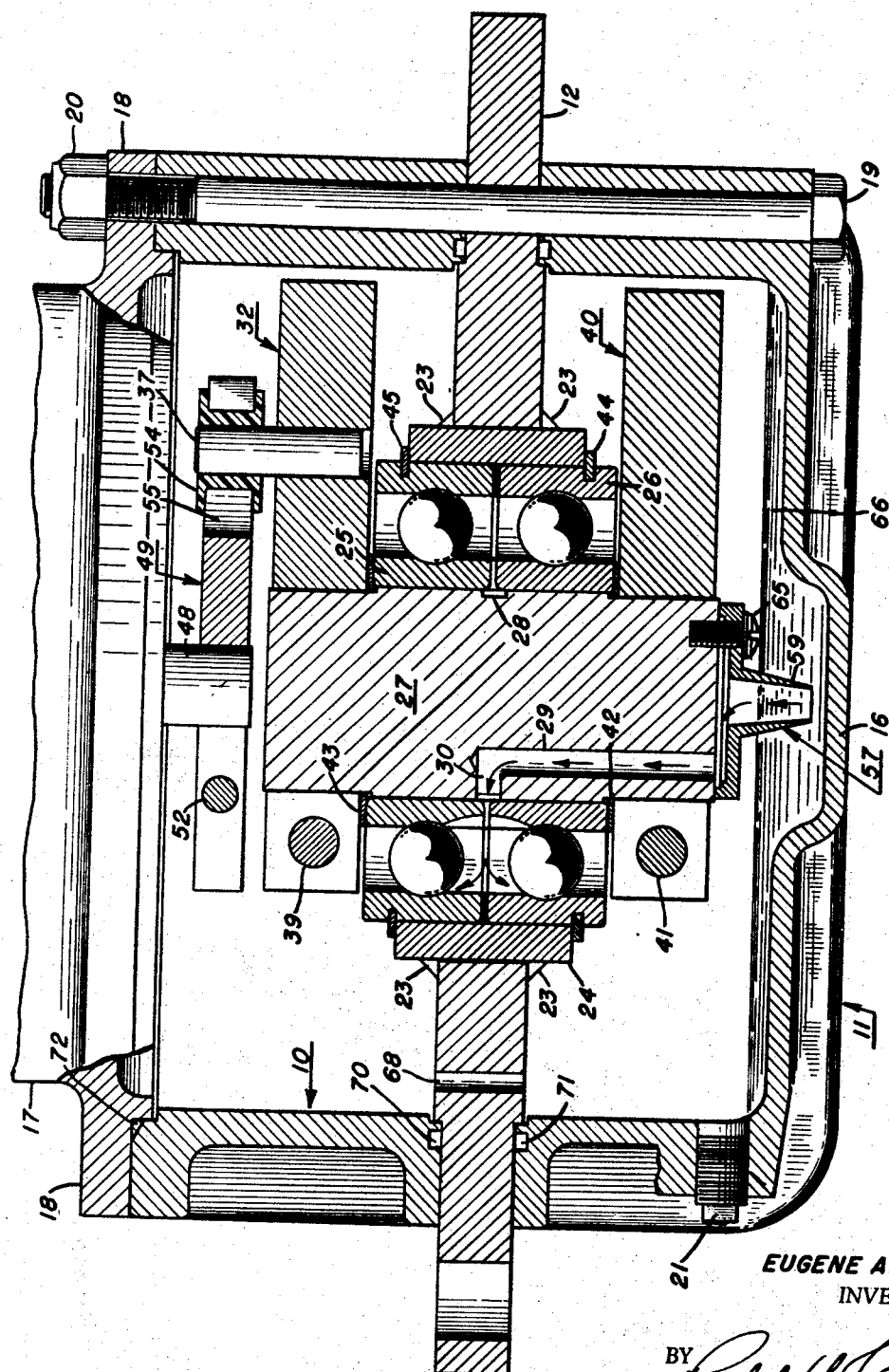
FIGURE 4 is an enlarged cross-sectional view taken along the line IV—IV of FIGURE 2 with a portion of the motor housing omitted.

Reference now is made to FIGURES 1–3. The housing, or pot, which encloses the mechanical components of the gyrator, comprises an upper section 10 and a lower section 11, cast of aluminum and disposed on opposite sides of a relatively heavy mounting plate 12, said plate being provided with a plurality of holes 13 for receiving fastening bolts by means of which the gyrator can be secured to a structure to be vibrated. The housing sections 10 and 11 include integral external heat-dissipating ribs 14 and 15, respectively, the ribs 15 continuing along the bottom of the lower housing section and terminating in a central well portion 16. The electric motor housing 17, also provided with heat-dissipating ribs, includes an integral flange 18. The housing sections 10 and 11, the mounting plate 12 and the motor housing flange 18, are provided with a plurality of aligned holes, whereby these components are secured together by the bolts 19 and cooperating nuts 20 to form a unitary structure. A threaded hole is provided near the lower and of the lower housing section. Such hole, closed by a conventional pipe plug 21, serves as a fill hole for applying a predetermined level of lubricating oil in the housing.

Reference now is made to FIGURE 4, which is a vertical cross-sectional view taken along the line IV—IV of FIGURE 2 but with only a portion of the motor housing shown partly in section and partly in elevation. The mounting plate 12 is provided with a central hole receiving the metal bushing 24, said bushing being welded to the mounting plate, as indicated by the numerals 23. This bushing constitutes a bearing housing for the upper ball bearing 25 and the lower ball bearing 26. Force-fitted through the inner races of the two bearings is a bearing shaft 27, which shaft has reduced-diameter ends and is provided with a circumferential groove 28 positioned between the two bearings. The shaft 27 also is positioned with a longitudinally-extending bore 29 extending from the lower end to a point somewhat beyond the groove 28, which bore is intersected by a radial bore 30.

Secured to the upper end of the bearing shaft 27 is an upper eccentric weight 32, which weight is also shown in the top, plan view of FIGURE 5 to which reference now also is made. This weight comprises a semi-circular portion 33 terminating in a generally radially-extending portion. Such radial portion is slotted to form the two arms 34 and 35 and the slot intercepts a hole 36 having a normal diameter somewhat exceeding that of the upper, reduced diameter end of the bearing shaft. The semi-circular portion 33 also is provided with a hole into which an end of a drive pin 37 is force-fitted. It will be apparent that the weight 32 is securely attachable to the upper end of the bearing shaft 27 by tightening the nut 38 on the bolt 39.

Referring specifically to FIGURE 4, the lower eccentric weight 40 is of the same shape and construction as the upper weight 12 and is secured to the lower end of the bearing shaft 27 by a nut threaded onto the bolt 41. However, the lower weight does not carry a drive pin. The lower eccentric weight 40 is spaced from an inner race of the lower bearing 26 by a washer 42, the upper eccentric weight 12 is spaced from the inner race of the upper bearing 25 by a washer 43, and the two bearings are restrained against axial movement relative to the bearing housing 24 by conventional split rings 44 and 45. It is here pointed out that the two bearings are force-fitted onto the bearing shaft 27 and a predetermined spacing between the bearings is established by means of suitable gauges which are removed after the bearings have been forced into proper positions. Thus, the radial bore 30, formed in the bearing shaft 27, communicates with the space between the bearings for a purpose to be described hereinbelow.

The motor drive shaft 48 extends into the upper housing section 10 and has secured thereto a drive coupling 49, which coupling is shown in the top plan view, FIGURE 6, to which reference now also is made. The drive coupling comprises a sturdy metal bar having a longitudinal slot 50 formed therein, which slot terminates in a central hole 51 for receiving the motor drive shaft. A bolt 52 and nut 53 serve as means for securing the drive coupling to the motor shaft. A double-headed nylon bushing 54 is slidably disposed within another slot 55 formed in the other end of the bar. As shown in FIGURE 4, the drive pin 37, carried by the upper eccentric weight 32, is snugly received in the central hole of the nylon bushing 54. Thus, rotation of the drive coupling 49, firmly secured to the motor drive shaft 48, results in a corresponding rotation of the upper eccentric weight, the bearing shaft 27, the inner races of both bearings, the lower eccentric weight 40, and an oil pump 57.

The construction of the oil pump 57 will best be understood by reference to FIGURES 7 and 8, FIGURE 7 being a top plan view and FIGURE 8 being a central cross-sectional view taken along the line VIII—VIII of FIGURE 7. The oil pump is a unitary metal member comprising a base flange 58 joined to a tapered, or conical portion 59, the latter terminating in a fine edge at the truncated apex. The upper surface of the flange is counterbored to form a bore 60, which bore is intersected by the two mounting holes 61 and 62. This results in a circular lip 63. A second bore 64, somewhat deeper and of smaller diameter than the bore 60, also is formed in the flange.

Referring back to FIGURE 4, the oil pump 57 is secured to the lower end of the bearing shaft 27 by two fastening screws and associated lock washers. These screws do not lie in the vertical plane through which the view of FIGURE 4 is taken and, therefore, only the one fastening screw 65 is here visible. With the oil pump secured in place, the truncated apex of the conical portion 59 extends into a pool of lubricating oil 66 carried by the lower housing section 11. The level of the oil is below the bearing shaft 27 and the depth of the oil, taken within the sump 16, is approximately ½ inch, the pipe plug 21 being located to prevent filling of the housing above such depth.

Upon rotation of the eccentric weight system, the oil ascends inside the conical portion 59, of the pump, and into the bores formed in the flange 58 thereof. Such bores form an impeller chamber wherein the oil is spun centrifugally, thereby becoming pressurized sufficiently to rise through the longitudinal bore 29 and radial bore 30, formed in the bearing shaft 27, as indicated by the arrows. The oil emerging from the radial bore 30 flows through the space between the bearing races and is thrown against the bearing balls by centrifugal force. Oil flowing downwardly returns directly to the bottom of the housing, whereas the oil accumulating above the mounting plate 12 drips through one more drainage holes 68 provided for this purpose.

In the device shown approximately to scale in FIGURE 4, wherein the housing has an outside diameter of 10 inches and a height of 7 inches, and wherein each eccentric weight is made of steel approximately 1 inch thick, rotation of the weights develops a thrust force of some 80,000 pounds. Such thrust force is applied to the heavy mounting plate 12 through the bearing housing 24. The housing sections 10 and 11 merely serve as a closure for the gyrator and as a container for the lubricating oil. With the weights, the bearings and the bearing housing symmetrically disposed with reference to a horizontal, median plane passing through the mounting plate, the thrust force is uniformly applied to both bearings, thereby promoting a smooth operation and a long operating life. The housing sections are not relied upon for the transmission of the thrust forces to the structure to which the gyrator may be mounted and, therefore, the housing sections can be light weight aluminum castings which provide for a maximum dissipation of heat generated within the housing. Further, the slight pressure imparted to the oil, when the device is in operation, is sufficient to maintain a continuous flow of oil through the bearings, thereby serving to equalize the temperature between the bearings and their supports. To prevent leakage of the oil out of the housing, the two housing sections 10 and 11 are provided with circular grooves having O rings 70 and 71 compressed therein. Also, an O ring 72 is compressed within the space defined by a chamfer formed at the upper end of the housing section 10 and a circular, downwardly-depending lip formed integral with the motor housing flange 18.

The drive pin 37, which mechanically couples the motor shaft to the rotatable weight system, fits snugly within the central hole of the nylon bushing 54, which bushing is slidable within the slot 55. Thus, the thrust forces, developed by rotation of the weights, are not transmitted to the motor drive shaft, the nylon bushing merely sliding within its slot in response to radial forces applied thereto. With the motor housing rigidly secured to the mounting plate 12, through the upper housing section 10, the motor and its drive shaft are subjected to some orbital movements as the mounting plate. Consequently, the motor bearings can be of conventional size.

Having now described the invention, those skilled in this art will be able to make various changes and modifications without thereby departing from the spirit and scope of the invention as recited in the following claims.

I claim:
1. A gyrator comprising,
   (a) a housing,
   (b) a rigid mounting plate extending through the housing wall and having a central hole formed therein,
   (c) a cylindrical bearing housing extending through said central hole and secured to the mounting plate,
   (d) a bearing shaft extending through said bearing housing and having ends projecting therefrom,
   (e) bearing means carried by said bearing housing and in engagement with said bearing shaft,
   (f) a pair of weights eccentrically secured to said bearin shaft,
   (g) power means carried by said housing and having a drive shaft,
   (h) means removably coupling the said drive shaft to one of said weights,
   (i) a pool of lubricating oil carried by the housing, and
   (j) means effective upon rotation of said bearing shaft to circulate oil through said bearing means.

2. The invention as recited in claim 1, wherein said bearing means comprises a pair of axially-aligned ball bearings and including means retaining the bearings against axial displacement relative to said bearing housing.

3. The invention as recited in claim 2, wherein the said bearings are spaced apart axially, wherein the means to circulate oil through the bearings comprises a conical member secured to an end of said bearing shaft and having a truncated apex extending into the pool of oil, and including means forming an oil passageway through the said bearing shaft, said passageway communicating at one end with the said conical member and at the other end with the space between the two bearings.

4. The invention as recited in claim 1, wherein the said means removably coupling the said motor drive shaft to one of the weights comprises a transverse bar secured to the drive shaft, a bushing slidable within a longitudinal slot formed in said bar, and a drive pin secured to the weight and extending into the hole of said bushing.

5. An electro-mechanical gyrator comprising,
   (a) a rigid mounting plate having a central hole formed therein,
   (b) a first housing section having open ends and disposed on the side of the mounting plate,
   (c) a second housing section having an open end and a closed end,
   (d) means securing the housing sections to the mounting plate,
   (e) an electric motor secured to the upper housing section and having a drive shaft extending into the housing section,
   (f) a cylindrical bearing housing extending through the central hole of the mounting plate and secured thereto, said bearing housing being spaced from and concentric with the motor drive shaft,
   (g) a pair of axially-spaced bearings force-fitted into the said bearing housing,
   (h) a bearing shaft in engagement with said bearings and having projecting ends,
   (i) a pair of weights eccentrically mounted on the projecting ends of the bearing shaft,
   (j) a pool of oil carried by the second housing section,
   (k) means mechanically coupling the motor drive shaft to one of said weights, and
   (l) means effective upon rotation of said bearing shaft to circulate oil through the said bearings.

6. The invention as recited in claim 5, wherein the said weights, bearings and bearing housing are symmetrically disposed with respect to the median plane of the mounting plate.

7. The invention as recited in claim 6, wherein the means mechanically coupling the motor drive shaft to one of the weights comprises a transverse bar secured to the motor shaft, a bushing slidable within a longitudinal slot formed in said bar, and a drive pin secured to the said weight and extending into the hole of said bushing.

8. The invention as recited in claim 6, including locking rings in engagement with the ends of said bearing housing and extending into circumferential grooves formed in the bearings.

9. The invention as recited in claim 6, including means forming an oil passageway which extends from the lower end of the bearing shaft and communicates with the space between the two bearings, and wherein the means to circulate oil through the bearings comprises a conical member having a truncated apex extending into the pool of oil and a base flange secured to the said end of the bearing shaft, said base flange being provided with a bore communicating with the passageway formed in the bearing shaft.

10. An electro-mechanical gyrator comprising,
    (a) a lower housing section having a closed bottom and an open top,
    (b) a rigid mounting plate spanning the open end of said housing section and having a central hole formed therein,
    (c) an upper housing section having open ends one end of which engages said mounting plate,
    (d) an electric motor having a housing provided with a flange engaging the open end of the upper housing section and a drive shaft extending into such housing section,
    (e) means securing together the motor flange, the mounting plate and the said housing sections to form a unitary structure,
    (f) a cylindrical bearing housing secured to the mounting plate and extending through the central hole thereof,
    (g) a pair of axially-spaced bearings force-fitted into said bearing housing,
    (h) a bearing shaft engaging said bearings and having projecting ends,
    (i) upper and lower weights eccentrically secured to the projecting ends of the bearing shaft,
    (j) a coupling bar secured to the motor shaft,
    (k) a bushing slidable within a longitudinal slot formed in the coupling bar,
    (l) a drive pin secured to said upper weight and extending into the hole of said bushing,
    (m) a pool of oil in the lower housing section,
    (n) an oil pump comprising a conical portion having a truncated apex and a base flange having a bore formed in the surface,
    (o) means securing the oil pump to the lower end of said bearing shaft with the apex of the conical portion extending into the pool of oil, and
    (p) means forming an oil passageway in said bearing shaft, said passageway communicating with the bore formed in the flange of the oil pump and with the space between the two bearings.

11. The invention as recited in claim 10, wherein the said bearings, bearing shaft, bearing housing and weights are symmetrically disposed relative to the median plane of the mounting plate.

References Cited

UNITED STATES PATENTS

| | | | |
|---|---|---|---|
| 2,116,708 | 5/1938 | Niekamp | 310—81 |
| 2,366,342 | 1/1945 | Lazan | 310—81 |
| 2,475,353 | 7/1949 | Doll | 310—81 |
| 2,940,326 | 6/1960 | Meyer | 310—81 |
| 2,945,970 | 7/1960 | Nordegren | 310—81 |
| 2,972,688 | 2/1961 | Mahlfeldt | 310—81 |

MILTON O. HIRSHFIELD, *Primary Examiner.*

J. D. MILLER, *Assistant Examiner.*